United States Patent [19]
Astley et al.

[11] Patent Number: 4,487,750
[45] Date of Patent: Dec. 11, 1984

[54] STABILIZATION OF WET PROCESS PHOSPHORIC ACID

[75] Inventors: Vivian C. Astley, New Orleans; Jody J. Taravella, Harvey, both of La.

[73] Assignee: Freeport Minerals Company, New York, N.Y.

[21] Appl. No.: 519,181

[22] Filed: Aug. 1, 1983

[51] Int. Cl.³ .............................................. C01B 25/16
[52] U.S. Cl. ................................ 423/321 R; 423/317
[58] Field of Search ............... 423/316, 317, 319, 320, 423/321 R, 321 S

[56] References Cited

U.S. PATENT DOCUMENTS

| | | | |
|---|---|---|---|
| 2,936,888 | 5/1960 | Williams | 423/321 R |
| 3,481,700 | 12/1969 | Legal et al. | 423/321 R |
| 3,528,771 | 9/1970 | Shearon et al. | 423/321 R |
| 3,907,680 | 9/1975 | Hill | 423/321 R |
| 4,048,289 | 9/1977 | Pierres | 423/317 |
| 4,110,422 | 8/1978 | Hill | 423/317 |
| 4,164,550 | 8/1979 | Hill | 423/321 R |
| 4,248,846 | 2/1981 | Hill | 423/317 |
| 4,250,154 | 2/1981 | Hill | 423/317 |
| 4,279,877 | 7/1981 | Hill et al. | 423/321 R |
| 4,293,311 | 10/1981 | Hill | 23/301 |
| 4,301,131 | 11/1981 | Sanchez | 423/321 R |
| 4,305,915 | 12/1981 | Hill | 423/321 R |
| 4,343,780 | 8/1982 | Wolstein et al. | 423/321 R |
| 4,364,912 | 12/1982 | Hill | 423/321 R |

Primary Examiner—Gregory A. Heller
Attorney, Agent, or Firm—Raûl V. Fonte

[57] ABSTRACT

An improved method for producing wet process phosphoric acid with low post-precipitation characteristics from an unclarified dilute wet process phosphoric feed acid is described. The feed acid is processed through crystallization, centrifugation and concentration steps under controlled conditions to produce the desired products. The method also allows for the simultaneous production of merchant grade phosphoric acid and clarified merchant phosphoric acid.

11 Claims, 3 Drawing Figures

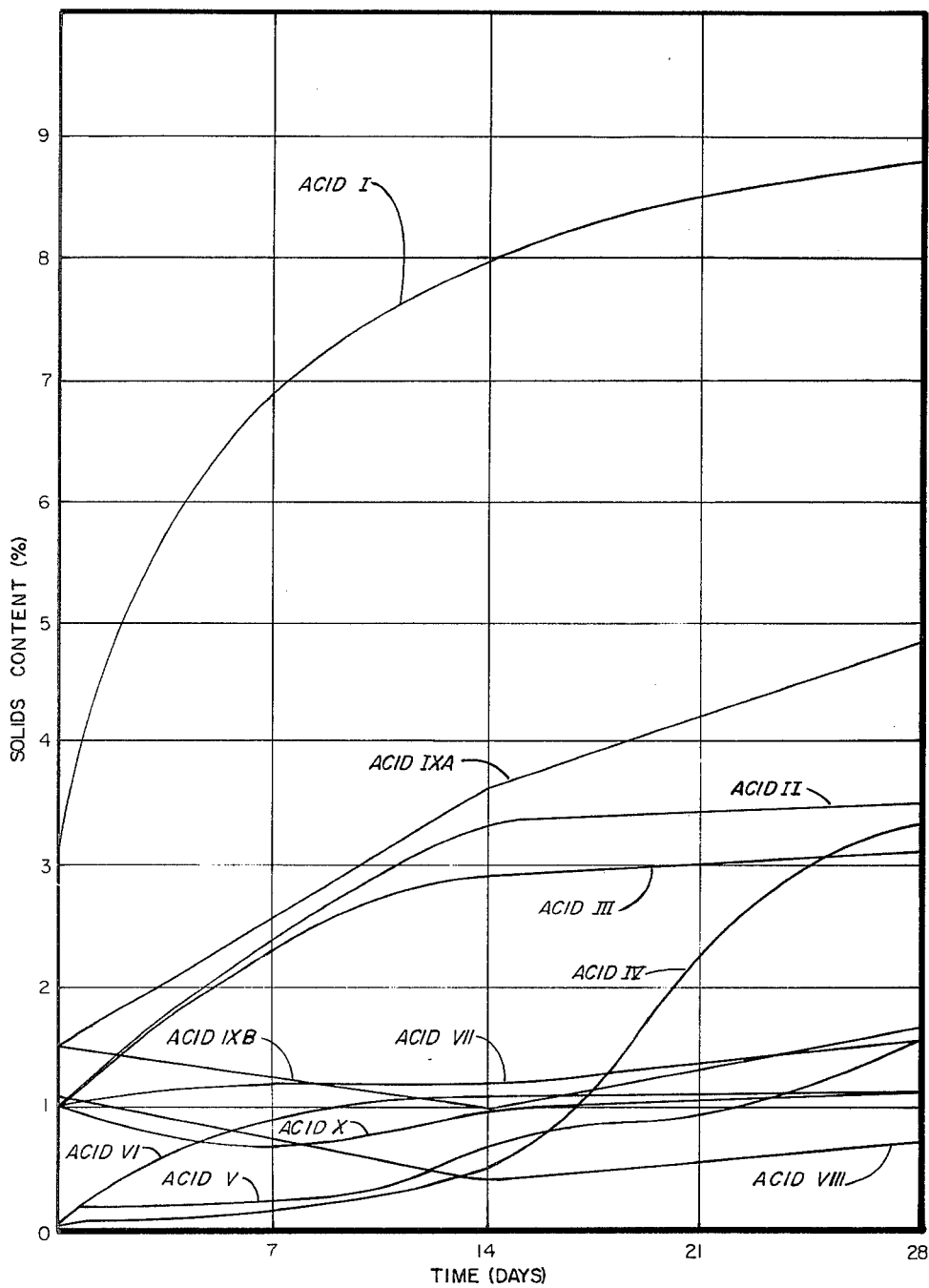

4,487,750

STABILIZATION OF WET PROCESS PHOSPHORIC ACID

BACKGROUND OF THE INVENTION

1. Field of The Invention

This invention relates to the stabilization of wet process phosphoric acid with respect to the post-precipitation of solids during storage and shipment of the acid.

2. Prior Art

Most phosphoric acid produced in the United States is produced by the wet process. In this process finely ground phosphate rock is slurried with sulfuric acid and recylced dilute phosphoric acid. The products produced by the chemical reaction between the phosphate rock and sulfuric acid are orthophosphoric acid (commonly known in the industry as phosphoric acid, or, more particularly, as wet process phosphoric acid), gypsum, and numerous other suspended and dissolved impurities. The slurry produced is filtered to remove solid impurities, of which gypsum is the major constituent. The resulting filtrate usually contains between about 25 and 35% by weight $P_2O_5$, and between about 1 and 8% by weight suspended solids. This dilute wet process acid is usually concentrated in multiple stage evaporators to about 52–54% $P_2O_5$ prior to storage and eventual shipment. During processing, storage and shipment the impurities contained in the wet process acid settle out to form a hard, voluminious sludge. This sludge formation is known in the industry as post-precipitation. The sludge contains a high proportion of iron and aluminum phosphate compounds. One of the major constituents of the sludge is the complex salt $(Al,Fe)_3KH_{14}(PO_4)_8 \cdot 4H_2O$. The sludge is difficult and costly to remove and, additionally, represents substantial losses of $P_2O_5$ values.

The impure state of wet process phosphoric acid is well known, and the post-precipitation of solids is a recognized problem. Many shipping grade acids are partially clarified by settling to reduce the sludge content prior to shipment. Settling, however, does not resolve the problem easily or economically because of the lengthy time it requires. For example, one month unassisted settling of 100 tons $P_2O_5$ per day as 54% $P_2O_5$ acid requires a minimum storage capacity of 750,000 gallons. Solids can be removed in shorter periods of time by centrifugation, but this still does not solve the problem of post-precipitation because acids clarified solely by centrifugation still exhibit excessive post-precipitation tendencies.

Minimizing post-precipitation may also be accomplished by various means of acid purification such as chemical precipitation, solvent extraction and ion exchange; however, these processes are complex and expensive.

One solution to the post-precipitation problem has been to combine clarification with other process operations so as to produce an acid in which post-precipitation is substantially inhibited. Such an acid is known in the industry as a stabilized acid. Considerable research has gone into developing processes for the manufacture of wet process phosphoric acid stabilized with respect to the post-precipitation of solids. One well known stabilization process is the Hill process, described in U.S. Pat. Nos. 4,110,422, 4,164,550, 4,248,846, 4,279,877, 4,293,311, 4,305,915 and 4,364,912.

U.S. Pat. No. 4,110,422 describes the basic Hill process, in which a stabilized wet process phosphoric acid is produced by addition of an aluminum silicate material such as perlite to clarified dilute phosphoric acid of about 22–35% $P_2O_5$ strength, concentrating the acid to about 42–52% $P_2O_5$, transfering it to a crystallization zone where additional clarification occurs, and then concentrating it to about 63% $P_2O_5$ strength.

U.S. Pat. No. 4,164,550 covers the same process as U.S. Pat. No. 4,110,422, but the $P_2O_5$ strength range of the feed acid to the process is 36–46%. U.S. Pat. No. 4,248,846 improves on the basic Hill process by the incorporation of a recycle stream from the crystallizer underflow to the acid train, addition of sulfuric acid to evaporators when processing rock high in iron and aluminum, and cooling one or more streams of the process. U.S. Pat. No. 4,279,877 modifies the Hill process for conditions of high-iron feed acid in which some of the iron is present in the ferrous form. If the $Fe_2O_3$-to-$P_2O_5$ weight ratio is higher than 0.04, an oxidant such as hydrogen peroxide is used to oxidize all ferrous iron to the ferric state. The treatment reduces post-precipitation of the final product acid. U.S. Pat. No. 4,293,311 also modifies the basic Hill process by incorporation of a crystallizer underflow recycle stream to the aluminum silicate addition vessel. This patent specifies that no oxidant is necessary if the $Fe_2O_3$-to-$P_2O_5$ weight ratio is between 0.03 and 0.04. Aluminum silicate is still required, however. U.S. Pat. No. 4,305,915 covers the composition of matter made by the above patents and having desirable characteristics with respect to its post-precipitation tendencies. The composition of matter is made by a process that requires the use of perlite or similar aluminum silicate.

U.S. Pat. No. 4,364,912 discloses the production of a stabilized acid without the use of aluminum silicate by prescribing a $Fe_2O_3$-to-$P_2O_5$ weight ratio lower than 0.03 in the feed acid with all other steps of the basic Hill process unchanged.

All of the processes described above require an initial clarification step. Most require the addition of aluminum silicate, and some require addition of an oxidant. Both the initial clarification step and the addition of aluminum silicate and oxidants add significantly to the cost of producing a stabilized acid. The addition of these steps also interferes with the simultaneous production of unstabilized grades of phosphoric acid such as normal merchant grade wet process acid and clarified merchant wet process phosphoric acid. It is apparent that a stabilization process not requiring these steps would be economically desirable. It is an object of this invention to provide one such process.

It is also an object of this invention to provide a wet process phosphoric acid substantially free of post-precipitation.

It is also an object of this invention to provide a wet process phosphoric acid that will remain free of post-precipitation for a long period of time.

Another object of this invention is to provide a process for stabilizing wet process phosphoric acid which process produces an excellent quality acid with respect to post-precipitation characteristics from high-iron acid feeds as well as from low iron acid feeds without aluminum silicate addition and without oxidation or any other such special treatment.

Another object of this invention is to provide an inexpensive process for producing wet process phosphoric acid stabilized with respect to post-precipitation.

Still another object of this invention is to provide a wet process phosphoric acid with higher-than-normal $P_2O_5$ content in order that superior liquid fertilizers can be produced from the acid.

A still further object of this invention is to provide a process for stabilizing wet process phosphoric acid which process will not interfere with the simultaneous production of unstabilized normal merchant grade wet process phosphoric acid and unstabilized, merchant clarified wet process phosphoric acid.

These and other objects are accomplished by the process of our invention and will become apparent to those skilled in the art from the description that follows.

SUMMARY OF THE INVENTION

This invention provides a process which substantially inhibits the post-precipitation of wet process phosphoric acid. By this we mean that an acid produced by the process of this invention will contain substantially less than 2.0% total solids after a 28-day period of normal storage and/or shipment; consequently, little or no solids will settle during transit or storage. Total solids include suspended as well as settled solids.

In the process of our invention, unclarified dilute phosphoric acid (25% to 35% $P_2O_5$, 1.0 to 8.0% total solids) from a conventional wet process filtration system is fed to conventional wet process evaporators, typically operating at 180°–190° F. and about 2 inches of mercury absolute pressure, where it is concentrated to a $P_2O_5$ content of 45–55%. This intermediate strength acid is then passed to a crystallization zone for a period of at least 8 hours and no more than 48 hours. The crystallization zone may consist simply of a conventional wet process acid product storage tank, which may or may not be agitated, but which should have some recirculation of bottom settled solids.

The intermediate (45–55% $P_2O_5$) strength wet process acid effluent from the crystallization zone is next passed to a centrifugation step where the acid is centrifuged to reduce its total solids content to less than 2.0%. Solids disposal from the centrifugation step may be accomplished by passing the solids to a conventional "high-solids acid" storage system and/or to the attack system.

The recovered overflow stream from the clarification zone is subsequently concentrated in one or more evaporators, typically operating at 180°–190° F. and 1–3 inches of mercury absolute pressure, to a final $P_2O_5$ strength of at least 58%. This stabilized concentrated wet process acid is then ready for storage or shipment.

It has also been discovered that a modification of this process can be implemented when the solids content of the acid passing through the first concentration step exceeds about 3.5%. The modification is to interrupt the first concentration step when the $P_2O_5$ concentration of the acid reaches 40–42%, process the acid through a centrifugation step, and then proceed through the remainder of the concentration step. The succeeding crystallization, centrifugation and second concentration steps would then be as previously described.

BRIEF DESCRIPTION OF THE DRAWINGS

FIG. 3 is a graph of pertinent data from the examples, and, in particular, of the relationship between time and solids content of the acids used in the examples, as further discussed hereinbelow.

PREFERRED EMBODIMENT OF THE INVENTION

Following is a detailed description of the preferred embodiment of the invention. Unless otherwise indicated, all percentage figures are on a weight basis.

The feed acid of the stabilization process is a dilute, wet process phosphoric acid of 25–35% $P_2O_5$ concentration and 1–8% total solids concentration. The acid is not clarified prior to entering the stabilization process. A typical analysis of the feed acid is shown in Table 1.

TABLE 1

| Typical Unclarified Dilute Wet Process Acid | |
|---|---|
| Component | % Range |
| $P_2O_5$ | 25–35 |
| $Fe_2O_3$ | 1.1–1.9 |
| $Al_2O_3$ | 0.8–1.6 |
| MgO | 0.4–0.7 |
| F | 1.5–4.0 |
| $SO_4$ | 1.0–3.5 |
| Carbon | 0.1–0.2 |
| Solids | 1–8 |

The steps of our stabilization process are as follows:

1. First concentration of the unclarified dilute acid to the intermediate strength of 45–55% $P_2O_5$. This concentration preferably takes place in conventional steam heated multiple-stage evaporators operated typically at 180°–190° F. and an absolute pressure of about 2 inches of mercury. Evaporation can be effected at higher temperatures if high temperature resistant linings are used in the evaporation equipment. A single stage evaporator may also be used instead of multiple stage equipment. Effluent acid from the evaporators, if processed no further, would be equivalent in quality to some merchant grade acids and would have high levels of post-precipitation (as shown in Table 3).

2. Transfer of the above intermediate strength wet process acid (45–55% $P_2O_5$) to a crystallization zone where it is held preferably for 8–24 hours for batch operation, or 16–48 hours for continuous operation. This crystallization zone may consist of product storage tanks or other storage vessels, which may or may not be agitated. Storage tank underflow composed of a slurry of precipitated solids may be recirculated to prevent excessive solids deposition in the storage tank. The crystallization step may be carried out at the same temperature of the intermediate strength acid but normally would be conducted at a lower temperature e.g., 140°–160° F., which is the normal acid storage temperature. In some cases, additional cooling may be employed in order to promote precipitation and facilitate solids removal.

3. Clarification of the acid by centrifugation to a suspended solids content of less than 2.0%. Centrifugation is accomplished by using any of a number of commercially available centrifuges. Solids disposal from the clarification step may be accomplished by passing the solids to a conventional high-solids acid storage system or to the attack system.

4. Second concentration of the acid to at least 58% $P_2O_5$ content in a conventional steam heated evaporator. The thus concentrated, stabilized acid is ready for storage and/or shipment at this point. Its typical post-precipitation characteristics are shown in Tables b 7-9, 11 and 13 (Examples 5-9).

Figure 1:
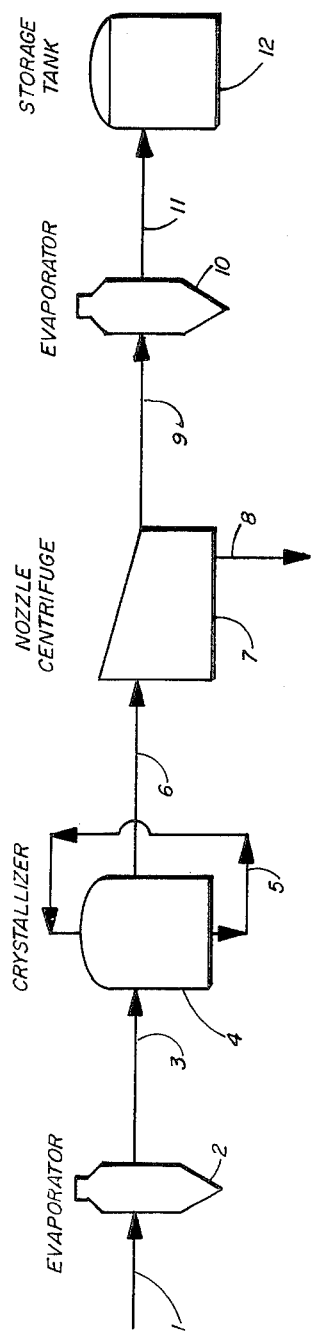
FIG. 1 is a flow diagram of the process of this invention in its simplest form, hereinafter referred to as the "basic process of this invention" or, simply, the "basic process".
Figure 2:
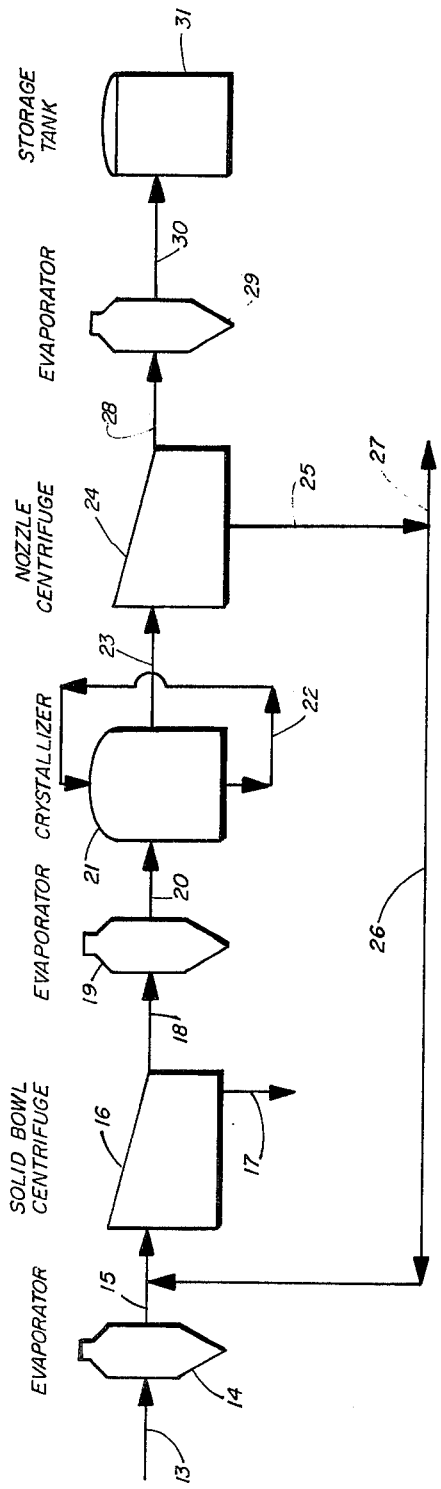
FIG. 2 is a flow diagram of a preferred embodiment of the invention, hereinafter referred to as the "modified process of this invention" or, simply, the "modified process".

Reference is now made to FIG. 1 for additional delineation of the basic process of this invention. Dilute wet process phosphoric acid of approximately 30% $P_2O_5$ concentration is fed by line 1 to an evaporation train 2 where the acid is first concentrated to approximately 54% $P_2O_5$ content. This acid is then transferred by line 3 to a crystallization tank 4 which is preferably equipped with an underflow recirculation line 5 which returns tank underflow solids to the upper level of the crystallization tank in order to prevent excessive solids precipitation. The crystallized acid is then fed via line 6 to nozzle centrifuges 7 for clarification. The concentrate from the centrifuges is discharged through line 8 and is returned to the high solids acid storage system or to the attack system. The clarified acid is next fed by line 9 to an evaporation train 10 where the acid is concentrated to a $P_2O_5$ content of 58-63%. The resulting stabilized acid is ready for shipment and is now transferred by line 11 to a product storage tank 12 for subsequent shipment In full scale plant operation we have found that a modification of the described basic process will result in improved efficiency when the solids content of the acid being first concentrated in the multiple-stage evaporators exceeds about 3.5%. Above this solids concentration, evaporator scaling becomes excessive. Additionally, control of solids is necessary to meet specified solids standards of unstabilized merchant grade acid when unstabilized acid is produced simultaneously with the subject stabilized acid. It therefore becomes more efficient in these circumstances to interrupt the multiple-stage evaporation process when the $P_2O_5$ concentration reaches 40-42% and transfer the acid to solid bowl centrifuges for a centrifugation step. This step is herein referred to as "interstage centrifugation". The centrifuged acid is then returned to the multiple-stage evaporators where the concentration is brought up to about 54% $P_2O_5$ content. The acid then proceeds through the process as previously described. This modification is shown in FIG. 2. We have found that most solids existing in phosphoric acid at 40-42% $P_2O_5$ concentration are non-phosphatic solids, and thus $P_2O_5$ losses may be minimized during centrifugation at this concentration. Above this concentration, phosphatic solids begin to precipitate and $P_2O_5$ losses increase during centrifugation. In addition, acid viscosity increases as $P_2O_5$ concentration increases and this makes centrifugation more difficult above the 40-42% $P_2O_5$ concentration. Stabilized acid produced by the modified process of this invention is of the same high quality with respect to post-precipitation as that produced by the basic process.

Reference is now made to FIG. 2 for further delineation of the modified process. Dilute wet process phosphoric acid of approximately 30% $P_2O_5$ concentration is fed by line 13 to an evaporation train 14 where the acid is first concentrated to approximately 41% $P_2O_5$. The acid is then transferred by line 15 to solid bowl centrifuges 16 for an interstage centrifugation step. The concentrate from the centrifuges is discharged through line 17 and returned to the attack system. The clarified acid from the interstage centrifugation step is next fed by line 18 into an evaporation train 19 where the acid is subjected to the second concentration step of this invention and where its $P_2O_5$ content is increased to approximately 54%. The 54% $P_2O_5$ acid is next transferred by line 20 to a crystallization tank 21 which is preferably equipped with an underflow recirculation line 22 which returns underflow solids to the upper level of the crystallization tank in order to prevent excessive solids precipitation. The crystallized acid is then fed via line 23 to centrifuges 24 for clarification. The concentrate from the centrifuges is discharged through line 25 and line 26 to the inlet line 15 of the interstage centrifugation step or through lines 25 and 27 to the high-solids product storage tank. The clarified acid is next fed by line 28 to an evaporation train 29 where the acid is concentrated to about 58-63% $P_2O_5$ content. The resulting stabilized acid is ready for shipment and is now transferred by line 30 to a product storage tank 31 for subsequent shipment.

It is significant that neither the basic process nor the modified process interferes with the production of other phosphoric acid products. Thus, typical unstabilized merchant grade phosphoric acid may be extracted immediately following the concentration step in which the acid has been evaporated to a $P_2O_5$ concentration of 45-55%. In addition, a typical unstabilized, clarified merchant wet process phosphoric acid may be extracted after the final centrifugation step. Thus, all three products may be produced simultaneously.

Interstage centrifugation in the modified process may be accomplished by using, preferably, solid bowl centrifuges, a type of centrifuges well known in the industry. Other types centrifuges can be used, but solid bowl centrifuges are well suited for handling the relatively coarse solids existing in the process acid at this point. The 40-42% $P_2O_5$ acid passes directly from the evaporators to the interstage centrifugation step. In addition, no storage of the clarified acid from the centrifuges is required prior to its reentering the evaporation train. The concentrate from the centrifuges is preferably returned to the attack system.

The crystallization step may be accomplished in conventional phosphoric acid product storage tanks or in tanks constructed specifically for the crystallization step. Preferably, a product storage tank used for this purpose should be equipped with a center cone, a rake and an underflow recirculation line. Proper crystallization of acid being continuously processed takes longer than crystallization of an acid being batch-processed. As conditions approach those of plug flow, retention time may be decreased. As a rule, 8 to 24 hours are preferred for a batchwise operation, while 16 to 48 hours are preferred for a continuous mode.

The second centrifugation step in the basic process is preferable accomplished using nozzle centrifuges. Other type centrifuges may be used but nozzle centrifuges are excellent for handling the relatively fine solids existing in the process at this point. The concentrate from the nozzle centrifuges—about 35% of process flow at this point—is sent, preferably, to the high solids acid storage system for shipment to customers as such. If interstage centrifugation is being practiced, any excess over shipments of high-solids acid may be returned to the process by means of the feed lines to the bowl centrifuges. The supernatant acid solution from the centrifuges—about 65% of the process flow—proceeds to the second concentration step. It is not necessary that the acid be sent immediately to the evaporators, i.e., it may be held in storage for a period of time. Eventually, however, the acid would begin to post-precipitate since the stabilization process is not complete.

The second concentration step is an essential step in producing a truly stabilized acid of high quality. We have found that it is necessary to evaporate the acid to a minimum $P_2O_5$ concentration of 58% to achieve stabilization. By so doing the product acid thus made will contain less than 2.0% solids after a 28-day period of storage or shipment. Qualitatively, the stabilized product acid will be characterized by negligible formation of sludge in equipment handling such acid. Normal unstabilized merchant grade phosphoric acid would, over a 28-day period, post-precipitate to such an extent that the solids content of the acid would exceed 5%. This can result in 4,000–5,000 pounds of sludge being formed in a 100-ton railcar. Equipment handling such acid would require cleaning, which is quite expensive. Additionally, there are freight costs associated with transporting the sludge. The improved post-precipitation characteristics of the acid produced by our invention results in substantial savings in costs associated with the shipping of wet process acid. It minimizes the cost of sludge handling and, in some cases, makes it unnecessary.

The stabilized acid produced by the invention has yet another advantage: a higher $P_2O_5$ content than normal merchant grade wet process acid. Thus, when processed to produce liquid ammonium polyphosphate fertilizer, the stabilized acid of our invention yields much higher levels of polyphosphates than similarly-processed merchant grade acid. The higher polyphosphate levels cause metal ions to be sequestered, thereby preventing or decreasing the undesirable solids deposition that often occurs in liquid fertilizers produced from normal merchant grade phosphoric acid.

Both our basic process and our modified process of stabilizing phosphoric acid with regards to post-precipitation are well suited for most existing plants producing merchant grade (about 52–55% $P_2O_5$) phosphoric acid. For example, no clarification of the dilute feed acid to either the basic or the modified process is necessary. Additionally, there is no need to add aluminum silicate, oxidizing agents or any other additives to produce the desired results, and, in most cases, no additional equipment need be purchased.

The following examples will illustrate our process but are not intended to limit the scope of our invention. Examples 1 through 9, following, were laboratory batch tests simulating in part or in its entirety the stabilization process as shown in FIG. 1. Laboratory tests in Examples 1 through 7 were performed using a common feed acid with the composition shown in Table 2. Laboratory tests in Examples 8 and 9 were performed using acid feeds which contained higher contents of iron and solids, respectively, as shown in Table 10 and 12.

TABLE 2

| Acid Composition | |
|---|---|
| Component | Weight % |
| $P_2O_5$ | 29 |
| $Fe_2O_3$ | 1.1 |
| $Al_2O_3$ | 0.77 |
| MgO | 0.37 |
| F | 1.9 |
| $SO_4$ | 2.0 |
| Total Solids | 1.37 |

All samples of acid produced in these tests were stored for 28 days. The temperature of the samples was kept at 140°–150° F. for the first 4 days and was allowed to remain at 70°–75° F. for the remaining 24 days. A laboratory stainless steel evaporator equipped with a condenser and vacuum system was used for evaporating the acid. The crystallization step was performed in polypropylene beakers of one-to four-liter size. Clarification was carried out using a laboratory bench top centrifuge. The batch sample sizes were approximately three liters.

EXAMPLE 1

The basic process of FIG. 1 was followed through the first concentration step. Evaporation conditions were 185° F. and 2 inches of mercury absolute pressure. This is roughly equivalent to the entire processing that many merchant grade acids undergo. The final $P_2O_5$ content of the acid produced was 54.7%. The acid produced was sampled and analyzed for solids content on a periodic basis. This example clearly shows the post-precipitation characteristics of a typical unstabilized merchant grade wet process phosphoric acid. These are shown in Table 3, following, and also on FIG. 3 (Acid I).

TABLE 3

| Example 1 - Post-Precipitation Data of Acid I | |
|---|---|
| Storage Time (Days) | % Solids |
| 0 | 3.1 |
| 1 | 4.0 |
| 4 | 6.1 |
| 7 | 6.8 |
| 14 | 8.1 |
| 21 | 8.2 |
| 28 | 8.8 |

EXAMPLE 2

The basic process shown in FIG. 1 was carried out in the same manner and under the same controlled conditions as in Example 1, with one exception: the second concentration step was not carried out. The $P_2O_5$ concentration of the acid produced was 54.8%; the crystallization retention time was 24 hours; the solids content of the acid effluent from the crystallization step was 3.5%, which was subsequently reduced by the centrifugation step to 1.0%. The post-precipitation characteristics of this acid are shown in Table 4 and on FIG. 3 (Acid II). These show the criticality of the second concentration step of the process of this invention: the clarified merchant phosphoric acid produced, while superior to normal merchant grade acid as regards to post-precipitation, still precipitated over 3% solids after 11 days.

TABLE 4

| Example 2 - Post-Precipitation Data of Acid II | |
|---|---|
| Storage Time (Days) | Acid Solids Content (%) |
| 0 | 1.0 |
| 7 | 2.3 |
| 14 | 3.3 |
| 28 | 3.4 |

EXAMPLE 3

The basic process shown in FIG. 1 was followed in its entirety with the exception that the final concentration step was discontinued when the $P_2O_5$ concentration reached 57%. Evaporation conditions were 185° F. and 2 inches of mercury absolute pressure in both concentration steps. As in Example 2, the acid produced was superior to normal merchant grade acid as regards to post-precipitation, but still precipitated over 3% solids after 25 days. This example supports our finding that a truly stabilized wet process acid must be concentrated to a minimum $P_2O_5$ strength of 58%.

The crystallization retention time in this example was 24 hours. The solids content of the acid effluent from the crystallization step was 3.5%. The solids content was reduced to 1.0% by the centrifugation step prior to the acid entering the second concentration step. The post-precipitation characteristics of the acid are shown in Table 5 and also on FIG. 3 (Acid III).

TABLE 5

Example 3 - Post-Precipitation Data of Acid III

| Storage Time (Days) | Acid Solids % |
|---|---|
| 0 | 1.0 |
| 7 | 2.3 |
| 14 | 2.9 |
| 28 | 3.1 |

EXAMPLE 4

The basic process shown in FIG. 1 and discussed previously was followed in its entirety with the exception that the crystallization retention time was limited to 3 hours instead of the 8 hours minimum time specified by the invention. Evaporation conditions were 185° F. and 2 inches of mercury absolute pressure in both concentration steps. The acid effluent from the crystallization step contained 3.6% solids. The solids content was reduced in the centrifugation step to less than 0.1%. The final $P_2O_5$ concentration of the acid produced was 59.5%. This example illustrates the criticality of crystallization retention time. The acid produced had a lower rate of post-precipitation than the acid of Example 1; however, it precipitated over 3% solids after 25 days. The results are shown in Table 6 and also on FIG. 3 (Acid IV).

TABLE 6

Example 4 - Post-Precipitation Data of Acid IV

| Storage Time (Days) | Acid Solids % |
|---|---|
| 0 | <0.1 |
| 1 | 0.1 |
| 4 | 0.1 |
| 7 | 0.2 |
| 14 | 0.5 |
| 21 | 2.0 |
| 28 | 3.3 |

EXAMPLE 5

The basic process shown in FIG. 1 was followed in its entirety. Evaporation conditions were 185° F. and 2 inches of mercury absolute pressure in both concentration steps. The crystallization retention time was 9 hours and the acid effluent from the crystallization step contained 4.4% solids. The solids content was reduced in the centrifugation step to less than 0.1%. The final $P_2O_5$ content of the acid produced was 59.9% and the acid product had low post-precipitation characteristics as shown in Table 7 and also on FIG. 3 (Acid V). This example illustrates the results obtained when the basic process of our invention is used.

TABLE 7

Example 5 - Post-Precipitation Data of Acid V

| Storage Time (Days) | Acid Solids % |
|---|---|
| 0 | <0.1 |
| 1 | 0.2 |
| 4 | 0.2 |
| 7 | 0.2 |
| 14 | 0.7 |
| 21 | 0.9 |
| 28 | 1.5 |

EXAMPLE 6

The basic process shown in FIG. 1 was followed in its entirety. Evaporation conditions were 185° F. and 2 inches of mercury absolute pressure in both concentration steps. The crystallization retention time was 20 hours and the acid effluent from the crystallization step contained 4.2% solids. The solids content was reduced in the centrifugation step to less than 0.1%. The final $P_2O_5$ content of the acid produced was 59.2%, and the acid product had low post-precipitation characteristics as shown in Table 8 and also on FIG. 3 (Acid VI). This example further illustrates the results obtained when the basic process of our invention is used.

TABLE 8

Example 6 - Post-Precipitation Data of Acid VI

| Storage Time (Days) | Acid Solids % |
|---|---|
| 0 | <0.1 |
| 4 | 0.7 |
| 7 | 0.9 |
| 14 | 1.2 |
| 21 | 1.1 |
| 28 | 1.1 |

EXAMPLE 7

The basic process shown in FIG. 1 was followed in its entirety. Evaporation conditions were 185° F. and 2 inches of mercury absolute pressure in both concentration steps. The crystallization time was 24 hours and the solids content of acid effluent from the crystallization step was 3.5%. This solids content was reduced by the centrifugation step to 1.0%. The $P_2O_5$ content of the acid product of the example was 58.5%.

This example illustrates that it is not necessary to reduce the solids content to near-zero in the centrifugation step to produce a stabilized acid in accordance with the process of our invention. The post-precipitation characteristics of the acid produced is shown in Table 9 and FIG. 3 (Acid VII).

TABLE 9

Example 7 of Post-Precipitation Data of Acid VII

| Storage Time (Days) | Acid Solids % |
|---|---|
| 0 | 1.0 |
| 7 | 1.2 |
| 14 | 1.2 |
| 28 | 1.5 |

EXAMPLE 8

The basic process of FIG. 1 was followed in its entirety. Evaporation conditions were 185° F. and 2 inches absolute pressure in both concentration steps. The composition of the feed acid is shown below in Table 10.

TABLE 10

| Acid Composition | |
|---|---|
| Component | Weight % |
| $P_2O_5$ | 26.7 |
| $Fe_2O_3$ | 1.39 |
| $Al_2O_3$ | 0.8 |
| MgO | 0.4 |
| F | 1.83 |
| $SO_4$ | 1.77 |
| Total Solids | 0.5 |

The crystallization retention time in this example was 24 hours. The solids content of the acid effluent from the crystallization step was 4.2%. The solids content was subsequently reduced to 1.1% by the centrifugation step. The $P_2O_5$ content of the final stabilized product was 58.6%. Results are presented in Table 11, below and also on FIG. 3 (Acid VIII). These results show that an excellent quality phosphoric acid can be produced by the process of our invention from high iron containing feed acid without any special treatment. The lower-than-initial solids content of the product acid at the end of the 28-day period is due to a redissolution phenomenum that occurs in some well-stabilized acids, when some of the suspended solids actually go into solution, thus lowering the total solids content of the stored or shipped acid.

TABLE 11

| Example 8 - Post-Precipitation Data of Acid VIII | |
|---|---|
| Storage Time (Days) | Acid Solids % |
| 0 | 1.1 |
| 14 | 0.4 |
| 28 | 0.7 |

EXAMPLE 9

In this example, two samples of an unclarified, high-solids feed acid containing 25.8% $P_2O_5$ and 5.0% solids were processed to different stages of the invented process to illustrate, first, the ability of the process to stabilize high-solids feed acids and, second, the criticality of the process steps. The composition of the feed acid is shown below in Table 12.

TABLE 12

| Acid Composition | |
|---|---|
| Component | Weight % |
| $P_2O_5$ | 25.8 |
| $Fe_2O_3$ | 1.1 |
| $Al_2O_3$ | 0.8 |
| MgO | 0.3 |
| F | 2.3 |
| $SO_4$ | 3.65 |
| Total Solids | 5.0 |

Sample A was processed by the process shown in FIG. 1 with the exception that the second concentration step was not performed. Evaporation conditions in the single concentration step carried out were 185° F. and 2 inches of mercury absolute pressure. The $P_2O_5$ content in the concentration step reached 55%. The acid then proceeded to the crystallization step where it was retained for 24 hours. The solids content of the acid effluent from the crystallization step was 13.8%. The crystallization step was followed by the centrifugation step where the solids content was reduced to 1.5%. The post-precipitation characteristics of the acid product are shown in Table 13 below and on FIG. 3 (Acid IX-A). The acid product precipitated more than 3% solids after only 11 days.

Sample B was processed through all steps of the invented process as delineated in FIG. 1. Evaporative conditions in each of the concentration steps was 185° F. and 2 inches mercury absolute pressure. The crystallization retention time was 24 hours and the acid effluent from the crystallization step contained 13.8% solids. The solids content was reduced in the centrifugation step to 1.5%. The final $P_2O_5$ content of the acid produced was 59%. The acid product of this example had low post-precipitation characteristics comparable to stabilized acids produced from lower solids feed acids. The post-precipitation data is shown in Table 13, following, and on FIG. 3 (Acid IX-B).

TABLE 13

| Example 9 - Post-Precipitation Data of Acids IX-A and IX-B | | |
|---|---|---|
| Storage Time (Days) | Acid Solids % | |
|  | IX-A | IX-B |
| 0 | 1.5 | 1.5 |
| 14 | 3.6 | 1.0 |
| 28 | 4.8 | 1.6 |

EXAMPLE 10

A full scale plant test run was conducted in which the following equipment was used:

Evaporators. The evaporator train was a steam heated multi-stage evaporator system sized to produce about 2400 tons per day of $P_2O_5$ as 54% $P_2O_5$ product acid. Each stage was equipped with vertical tube and shell heat exchangers. Heating and evaporation was accomplished in each heat exchanger under vacuum (2 inches of mercury absolute pressure) being provided by barometric condensers and jet ejectors. Evaporation temperature in the final stage was 185° F.

Centrifuges. Solid bowl centrifuges were used in the interstage centrifugation step of the modified process. They were composed of two principal elements—the bowl and the conveyor, the conveyor fitting closely inside the bowl. The bowl rotates at a rapid speed causing settling forces on the solids particles to be about a thousand times gravity and insuring a thorough separation from the suspending liquid. The conveyor rotates at a slightly slower speed than the bowl. Solids exit from the centrifuge via the conveyor. The clarified acid exits through adjustable overflow weirs contained in the bowl. Nozzle centrifuges were used to reduce the solids content of the acid just prior to the second concentration step. The nozzle centrifuges have been found to be efficient in removing the fine, light solids existing in the acid at that point. In operation, acid from the crystallization tanks was pumped to the nozzle centrifuges by way of rotary strainers which detained any oversize particles in the feed. After entering the centrifuge, the acid was brought up to high speed by the feed impeller, after which it entered the separation chamber where centrifugal forces thousands of time higher than gravity caused the bulk of the solids to sink rapidly outward to the periphery of the rotor where they were continuously expelled through fixed open nozzles in the rotor. This was the underflow of the centrifuge, and it had a solids content of about 16% and constituted about 35% of the process stream at this point. The overflow stream, containing less than 2% solids, constituted the other 65%. Each centrifuge can handle 100-150 gpm of feed acid.

Crystallizer. The crystallizer consisted of a conventional 4500-ton phosphoric acid storage tank equipped with a rake, center cone and a underflow recirculation line. The underflow recirculation line provided a means of returning tank bottom solutions to the upper level of the crystallization tank. The tank was rubber lined.

Four hundred tons (as $P_2O_5$) of stabilized acid were produced in this example following the flow diagram of FIG. 2.

Referring to FIG. 2, dilute 30% $P_2O_5$ wet process phosphoric acid was processed through the evaporation and interstage centrifugation steps to line 20. At this point, the acid had reached a concentration of 54% $P_2O_5$. The production run continued with the acid next going to a product storage tank for a 48 hour crystallization step. An analysis of the effluent acid from this tank showed a $P_2O_5$ concentration of 54.4% and a solids content of 4.4%. The acid was next centrifuged using nozzle centrifuges, this step decreasing the solids content to 1.2%. The next and final step consisted of feeding the acid to a single steam-heated evaporator where the acid was concentrated to 58.6% $P_2O_5$. The solids content of the final stabilized product was 1.0%. A five-gallon sample of the product acid was stored at ambient temperature. A check on solids level of the sample over the next month indicated excellent stability as shown in Table 14 and also on FIG. 3 (Acid X).

This example illustrates the results obtained by the invented process in full scale plant operations.

TABLE 14

Example 10 - Post-Precipitation Data of Acid X

| Storage Time (Days) | Acid Solids % |
|---|---|
| 0 | 1.0 |
| 7 | 0.7 |
| 14 | 1.0 |
| 28 | 1.1 |

We claim:

1. A method of producing wet process phosphoric acid with low post-precipitation characteristics from an unclarified dilute wet process phospheric acid solution having a weight ratio of $Fe_2O_3$ to $P_2O_5$ substantially higher than 0.03 which comprises:
   (a) concentrating said unclarified dilute wet process phosphoric acid solution having a weight ratio of $Fe_2O_3$ to $P_2O_5$ substantially higher than 0.03 in a first evaporation zone until the $P_2O_5$ content of the solution is between 45 and 55%;
   (b) subjecting the concentrated acid solution to crystallization for at least 8 hours;
   (c) clarifying the crystallized acid solution by centrifugation until its total solids content is less than 2%; and
   (d) concentrating said clarified acid solution in a second evaporation zone until the $P_2O_5$ content of said clarified acid solution is between 58 and 63% to provide a wet process phospheric acid with low post-precipitation characteristics.

2. The method of claim 1 wherein said unclarified dilute wet process phosphoric acid solution has a total solids content of between about 1 and 8%.

3. The method of claim 2 wherein said total solids content is substantially higher than 2%.

4. The method of claim 1 wherein said crystallization is carried out batchwise for less than 24 hours.

5. The method of claim 1 wherein said crystallization is carried out in a continuous mode for at least 16 hours.

6. The method of claim 1 wherein said low post-precipitation characteristics of the wet process phosphoric acid produced is quantitatively expressed as a maximum content of 2% total solids in said acid at any time during the first 28 days of either or both storage and shipment.

7. The method of claim 1 further comprising the interstage centrifugation of the acid solution undergoing concentration in said first evaportion zone when the $P_2O_5$ content of said acid solution reaches between 40 and 42%.

8. The method of claim 7 wherein the total solids content of said acid solution undergoing concentration is higher than about 3.5%.

9. A process for simultaneously manufacturing merchant grade wet process phosphoric acid, clarified merchant wet process phosphoric acid and stabilized wet process phosphoric acid with low post-precipitation characteristics, said process comprising:
   (a) concentrating an unclarified dilute wet process phosphoric acid solution having a weight ratio of $Fe_2O_3$ to $P_2O_5$ substantially higher than 0.03 in a first evaporation zone until the $P_2O_5$ content of the solution is between 45 and 55%;
   (b) separating a first fraction of the concentrated acid solution in (a) to provide a merchant grade phosphoric acid;
   (c) subjecting a second fraction of the concentrated acid solution in (a) to crystallization for at least 8 hours but less than 48 hours;
   (d) clarifying the crystallized acid solution in (c) by centrifugation until its total solids content is less than 2%;
   (e) separating a first fraction of the clarified acid solution in (d) to provide a clarified merchant wet process phosphoric acid; and (f) concentrating a second fraction of the clarified acid solution in (d) in a second evaporation zone until the $P_2O_5$ content of said second fraction of the clarified acid solution in (d) is between 58 and 63% to provide a stabilized wet process phosphoric acid with low post-precipitation characteristics.

10. The process of claim 9 wherein the solids content of said merchant grade phosphoric acid is between 3 and 15%.

11. The process of claim 9 wherein said separation of said first fraction of the concentrated acid solution in (a) and said crystallization of said second fraction of the concentrated acid solution in (a) are effected simultaneously by subjecting said concentrated acid solution in (a) to crystallization for at least 8 hours but less than 48 hours and separating the crystallization underflow from the crystallization mother liquor to provide a merchant grade wet process phosphoric acid in the form of the crystallization underflow and a crystallized acid solution in the form of the crystallization mother liquor.

* * * * *